United States Patent
Wuerth et al.

(10) Patent No.: US 6,860,284 B2
(45) Date of Patent: Mar. 1, 2005

(54) METHOD AND DEVICE FOR CONTROLLING AT LEAST ONE VALVE

(75) Inventors: Gebhard Wuerth, Sulzbach Laufen (DE); Matthias Schanzenbach, Eberstadt (DE); Juergen Binder, Ostfildern (DE); Timo Jahnz, Moeglingen (DE); Ulrich Gottwick, Stuttgart (DE); Michael Schubert, Althengstett (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/332,686
(22) PCT Filed: Apr. 27, 2001
(86) PCT No.: PCT/DE01/02370
§ 371 (c)(1), (2), (4) Date: Sep. 2, 2003
(87) PCT Pub. No.: WO02/05048
PCT Pub. Date: Jan. 17, 2002

(65) Prior Publication Data
US 2004/0025941 A1 Feb. 12, 2004

(30) Foreign Application Priority Data
Jul. 12, 2000 (DE) .......................................... 100 33 909

(51) Int. Cl.$^7$ ............................ G05D 7/06; B60T 15/00
(52) U.S. Cl. ................................ 137/15.06; 137/487.5; 137/487
(58) Field of Search ............................. 137/15.06, 487, 137/487.5

(56) References Cited

U.S. PATENT DOCUMENTS

| | | |
|---|---|---|
| 3,633,597 A | 1/1972 | Jobe |
| 4,538,228 A | 8/1985 | Brearey et al. |
| 4,694,651 A | 9/1987 | Yardley et al. |
| 6,170,506 B1 * | 1/2001 | Butwin et al. .................. 137/2 |
| 6,592,099 B2 * | 7/2003 | Yamamoto et al. .... 251/129.04 |

FOREIGN PATENT DOCUMENTS

| | | |
|---|---|---|
| DE | 196 54 427 | 6/1998 |
| DE | 198 07 366 | 8/1999 |
| DE | 198 07 368 | 8/1999 |

* cited by examiner

Primary Examiner—Ramesh Krishnamurthy
(74) Attorney, Agent, or Firm—Kenyon & Kenyon

(57) ABSTRACT

A method and a device for controlling at least one valve, in response to a detected leak in the system including the valve. An activation signal is generated which opens the valve briefly for flushing purposes and closes it again, or moves the valve ball at great speed onto the valve seat.

10 Claims, 2 Drawing Sheets

METHOD AND DEVICE FOR CONTROLLING AT LEAST ONE VALVE

FIELD OF THE INVENTION

The present invention relates to a method and a device for controlling at least one valve.

BACKGROUND INFORMATION

In modern control systems, electrically operable valves, which are used as actuators to set at least one parameter and/or a component, are often used. A field of application of valves of this type is the control of wheel brakes, in which the hydraulically or pneumatically generated pressure is controlled in the wheel brakes using the valves. It is problematic in this case that contaminants, which prevent complete closing of a valve, may penetrate in the area of a valve. Leaks may arise in the system due to this. This is not useful in the control of wheel brakes in particular, since the brake pressure in the wheel brakes may no longer be completely maintained and/or the system pressure necessary for brake activation may no longer be provided or may only be provide with more effort.

Electrically operable seat valves which are only partially opened to control the brake pressure in at least one wheel brake are discussed in German Published Patent Application No. 196 54 427. In particular in valves of this type, which are not only completely closed or completely open, but also assume intermediate positions, contaminants may get stuck between the armature and the valve seat. The normally existing filtering system of the pressure medium (e.g., hydraulic liquid) may not be as fine as desired for reasons of flow resistance. As a consequence, the problem of contamination leading to a leak when the valve is not activated or preventing complete closing of the valve when it is activated arises even in valves of this type.

In this method, the current through the valve is regulated using a current regulator. The setpoint of the current regulator is selected by a brake pressure controller using a pulse width modulated signal, for example. In this case, the actual brake pressure is adjusted to the intended brake pressure. For reasons of comfort and control technology, the maximum change of current per unit of time is limited in this case.

Deriving error states, which indicate valve contaminants of this type, in an electrohydraulic brake system on the basis of the behavior of the accumulator pressure is discussed in German Published Patent Application No. 198 07 368.

A method, using the brake pressure in the components which control the wheel brakes is monitored for faults, is discussed in German Published Patent Application No. 198 07 366, using the example of an electrohydraulic braking system. In case of fault, emergency operation is initiated depending on the type of fault, for example, 3-wheel operation or switching off the controller, which leads to uncomfortable braking behavior at the least.

SUMMARY OF THE INVENTION

The availability of the system equipped with the valve(s) is significantly increased through special activation of the valve(s) to remove the contamination. This is useful in electrically controlled braking systems in particular, since in this case emergency operation, which is typically restrictive, may be dispensed with upon removal of the contamination.

An intrinsic deficiency of regulating or switching valves which are operated in middle positions is corrected in particular.

By operating the valve(s), contamination particles which have a size which may no longer be caught by filtering in a technically expedient manner are removed. The operation of the valve(s) for cleaning is therefore useful in particular as a supplement to the filtering of the pressure medium.

The present invention may be used in both hydraulic valves and in pneumatic valves. In this case, the effects of the present invention are not restricted to use in wheel brakes, but also extend to all applications, in particular also to those hydraulic or pneumatic valves which are used for controlling other components or variables thereof, including the field of automation, for example.

Two different methods of removing the contamination are used as a function of the pressure differential over the valve, so that optimum removal of the contamination may be achieved under any conditions.

In addition, the removal of the contamination itself is analyzed for diagnostic purposes and/or to influence the valve control (e.g., pressure regulation).

In response to a leak detected in one of the discharge valves (or in an intake valve), in the case of too small a pressure differential, a high flow speed is generated in the area of the valve(s), by opening inlet and discharge valves briefly.

DETAILED DESCRIPTION

Figure 1:
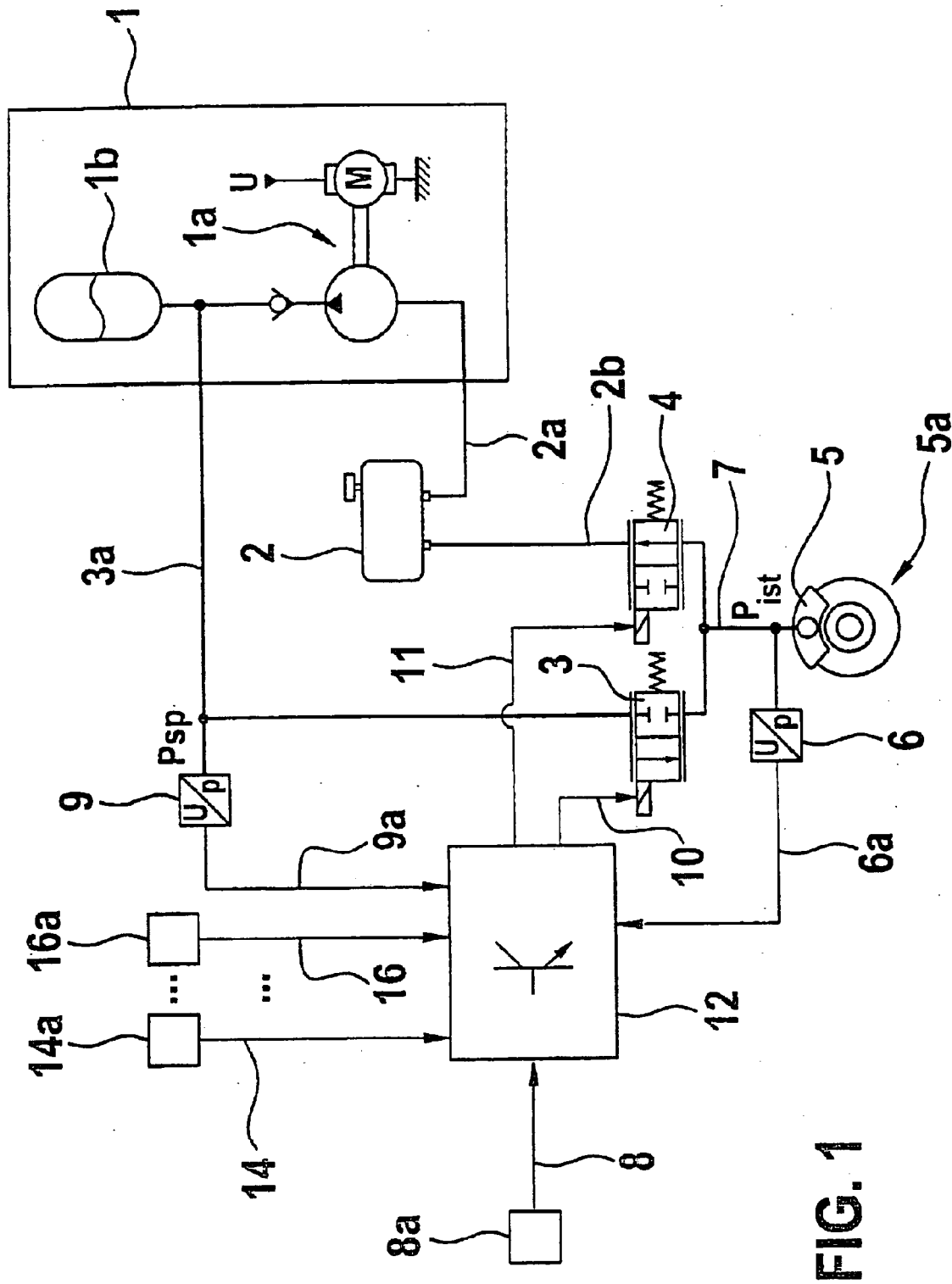
FIG. 1 shows the construction of an electrically controlled braking system according to an exemplary embodiment using the example of a wheel brake.

In FIG. 1, a control system for the braking system of a vehicle is outlined using the example of a single wheel brake. This brake includes a typical pressure supply 1, which may include, for example, an electrohydraulic pump 1a and a piston gas pressure accumulator 1b. Furthermore, a liquid reservoir 2 is provided, which feeds pressure supply 1 and receives the liquid when the pressure is reduced in the wheel brake. For this purpose, a line 2a connects reservoir 2 to the suction-side inlet of pump 1a, while a second line 2b leads from reservoir 2 to the valve systems for controlling the brake pressure in the wheel brake. Brake calipers 5 of wheel 5a are connected via a pressure line 7 to the valve system for controlling the brake pressure in the wheel brake cylinder. In an embodiment, the valve system includes two solenoid seat valves 3 and 4 for pressure buildup and pressure reduction. Solenoid seat valve 3 (intake valve) for pressure buildup is normally closed in an exemplary embodiment; valve 4 (discharge valve) for pressure reduction is normally open. Valve 4 is connected to liquid reservoir 2 via line 2b, while valve 3 is connected via a line 3a to pressure supply 1, and there to the delivery line of pump 1a. A pressure sensor 6, which detects the pressure in line 7, i.e., the pressure in the brake disc cylinder, is provided for detecting the brake pressure in brake calipers 5 of wheel 5a. Such a pressure represents actual pressure $P_{actual}$, and the sensor sends a corresponding electrical signal to control unit 12 via line 6a. The pressure in brake line 3a and/or in accumulator 1b, accumulator pressure PSP, is similarly detected by a pressure sensor 9 and a corresponding electrical signal is fed to control unit 12 via line 9a.

Control unit 12, which contains, among other things, a pressure controller for the wheel brake pressure and a current controller for each valve to set the current which flows through the valve winding, controls solenoid valves 3 and 4 via output lines 10 and 11 to set the brake pressure in brake calipers 5. At least one electrical signal corresponding to the brake pedal actuation is supplied to control unit 12 via line 8 by a measurement device 8a for detecting the driver braking intent, for example from a travel sensor, force sensor, and/or pressure sensor connected to the brake pedal. Furthermore, input lines 14 to 16 from measurement devices 14a to 16a, which detect the parameters of the motor vehicle which are analyzed for brake pressure regulation, are supplied to control unit 12. These types of parameters are, for example, the wheel speeds, axle loads, lateral acceleration, etc. These signals are used in the framework of typical antilock braking systems, traction control systems, vehicle dynamics controllers, and control systems based on the axle load. In an embodiment, the valves are the seat valves which are discussed in the references cited above and which are activated in such a manner that they may assume any desired opening.

Control unit 12 detects a measure of the brake pedal actuation via line 8, which it converts into an intended pressure $P_{setpoint}$, desired by the driver, to be set under the existing operating conditions, taking further parameters, which are supplied via lines 14 to 16, into consideration, by analyzing characteristics, characteristic fields, tables, or calculation steps. This intended pressure is compared to the actual pressure in the wheel brake calipers detected by measurement device 6 and set, as a function of the difference, by activating at least one of solenoid valves 3, 4 in the framework of the pressure regulation described in the following. A pressure regulation circuit of this type is provided for each electrically controllable wheel brake of the vehicle. In the embodiment, the signals output from control unit 12 via lines 10 and 11 are current signals (output signals of current controllers), which result in an application of force which moves the valve into the required intermediate position.

In the embodiment shown in FIG. 1, the solenoid valve system is implemented using 2/2 directional-control valves, which are also used in typical ABS systems. In addition, in other exemplary embodiments, a valve including two seats, one armature, and one electrical terminal is used instead of the two valves 3 and 4. Furthermore, in addition to the direct detection of the brake pressure using pressure sensor 6, in another exemplary embodiment the pressure effect may be derived by detecting the braking force from deformations on elements of the brake calipers or their mounting.

In the embodiment, regulated current drivers are used, in which, in the framework of a regulating circuit, the current established by the pressure controller as the setpoint value is compared to an actual current through the coil of the solenoid valves detected at the valve system and adjusted accordingly. However, in other exemplary embodiments, switched current drivers are used, which activate the output stages for the valves using pulse width modulated signals so that a desired mean excitation current arises, corresponding to the pulse width in the valve winding.

In control valves of this type, activated on demand, which may assume any position between the completely closed position and the completely open position, there is the danger, depending on the system, that contamination, which results in imperfect functioning of the valve (e.g., a leak at the intake valve), will arise at the particular valve seat. It has been shown that contamination of this type may not be removed through filtration, since the operating properties of the braking system are significantly impaired due to the excessive flow resistance of a fine filter, in particular in hydraulic braking systems. Valves which are normally closed (e.g., the intake valves cited above) are affected by contaminants of this type in particular, since they are opened widely much less often than valves which are normally open.

The control unit also monitors the correct functioning of the control system, in particular of the valves. In response to contamination, the system behavior deviates from the defined behavior. For example, an accumulator pressure reduction without braking, a too small accumulator pressure gradient during the accumulator charging by the pump, an excessive accumulator charging time, an undesired pressure increase in the wheel brakes, an excessive frequency of accumulator recharging, discharge of the accumulator when the vehicle is shut off, or the like, occurs. These types of fault, which may indicate such a contamination in the area of the valve, are detected by the system monitoring software. An example of this is discussed in the references cited above. In any case, the measured accumulator pressure, and/or the wheel brake pressure(s) are compared to selected limit values in the particular operating state (braking, no braking, accumulator charging process) and a fault is derived therefrom.

To remove a valve seat contamination, the valves (simultaneously or consecutively), and for a localized fault, only the valve affected by the fault, are opened sufficiently wide or completely and flushed using a high pressure differential (blown through). In this case, the valve is activated independently from the regulating circuit which controls the valve. The pulse length (current setpoint value or valve activation signal), the intensity of the activation (magnitude of the current through the valve), and/or the pulse sequence (chronological sequence of the intended current pulses or pulse width modulated activation signals) is freely selectable and should be suitably adjusted. It is important that a sufficient flow speed, which entrains the particles, is present at the point of contamination. Therefore, a sufficiently large pressure differential is necessary at the valve seat. In regard to the activation of the valve, the length and magnitude of the current which flows through the valve is suitably selected in consideration of the braking effect during flushing of the valve. It has been shown that currents which open the valve wide for 10 milliseconds have provided favorable results in one exemplary embodiment.

For the case in which only slight pressure differentials exist across the valve, in the extreme case no pressure differential, another method of removing the contamination is used as an alternative to the above method. In this case, the valve ball is moved at great speed from the open position into the seat. For ball seat valves which are normally open, this is performed by briefly applying the current; for valves which are normally closed, by briefly cutting off the current. In this case, the predefined quantity for the current through the valve winding or the control signal which produces the mean current is suddenly set to the value which results in a movement of the valve ball into its seat (for valves which are normally open, a selected current value, for valves which are normally closed, the value zero). It is to be noted in this case that in normal operation the rate of change in the current is limited for reasons of comfort. Through the impact of the valves, a large flow speed is generated in the area of the valve seat, through which the contaminant particles are caught and carried away. In addition, contaminant particles such as aluminum compounds, metal particles, rubber particles, etc. are fragmented by the impact of the valve or pushed out of the valve.

After the valve actuation is terminated in the framework of the first method (referred to in the following as flush pulse) or the second method (referred to in the following as valve impact), in an embodiment, the success of this measure is checked by the system monitor described above. If this check shows that there is no longer a fault, success may be assumed. If the reverse is the case, in the embodiment, the flush pulse and/or the valve impact are repeated. In practice, such repetitions are performed for a selected number of attempts. If no improvement of the malfunction results, it is assumed that the fault may not be removed by one of the measures described above. Emergency operation is then initiated, and an electrically controlled braking system switches over to hydraulic and/or pneumatic brake operation.

In particular for the flush pulse, but also for the application of the method of valve impact, pressure may be built up in the wheel brake calipers by opening the valve, and an effect on the driver which is undesirable per se may be produced in this manner. In order to perform the flush pulse and the valve impact with as little effect as possible on the vehicle behavior, the intensity and/or length of the operation of the valve is adjusted as appropriate. The intensity and/or the length are to be selected in this case in such a manner that suitable flushing of the valve occurs. The volume quantity flowing through the valve in this case is so small that no noticeable braking effect results. Therefore, a current intensity below the maximum current intensity is typically selected for the flush pulse. If the detected fault, which is caused by contamination, is not removed by one or more flushings of the valve, in one exemplary embodiment, the current intensity and/or the length of the flush pulse is increased in further attempts before emergency operation is initiated. The corresponding applies for valve impact, the rate of change in the current being a variable dimension in this case.

The fact that a flush pulse or a valve impact has been performed is stored for diagnosis. In this manner, the slight effect on the driving behavior and/or the driving noise may be documented and/or an instruction for change or filtration of the brake liquid may be given to the service personnel. Furthermore, the output of the flush pulse or the valve impact is used for the purpose of regulating the operation of the system in a controlled manner even during the time of the malfunction. In response to a fault (e.g., leak), the pressure controller is controlled through repeated disc pressure buildup and reduction operations or through repeated activation of the accumulator charging pump in such a manner that the fault is counteracted.

The pressure controller itself is non-operational during the output of the flush pulse or the signal for valve impact.

In addition to the use of the methods described for intake valves, they are also used for discharge valves. The methods described are also not limited to the control valves, but are used in all other switching valves in a braking system or in general in all valves in a hydraulic or pneumatic system, including in the field of automation, for example.

Figure 2:
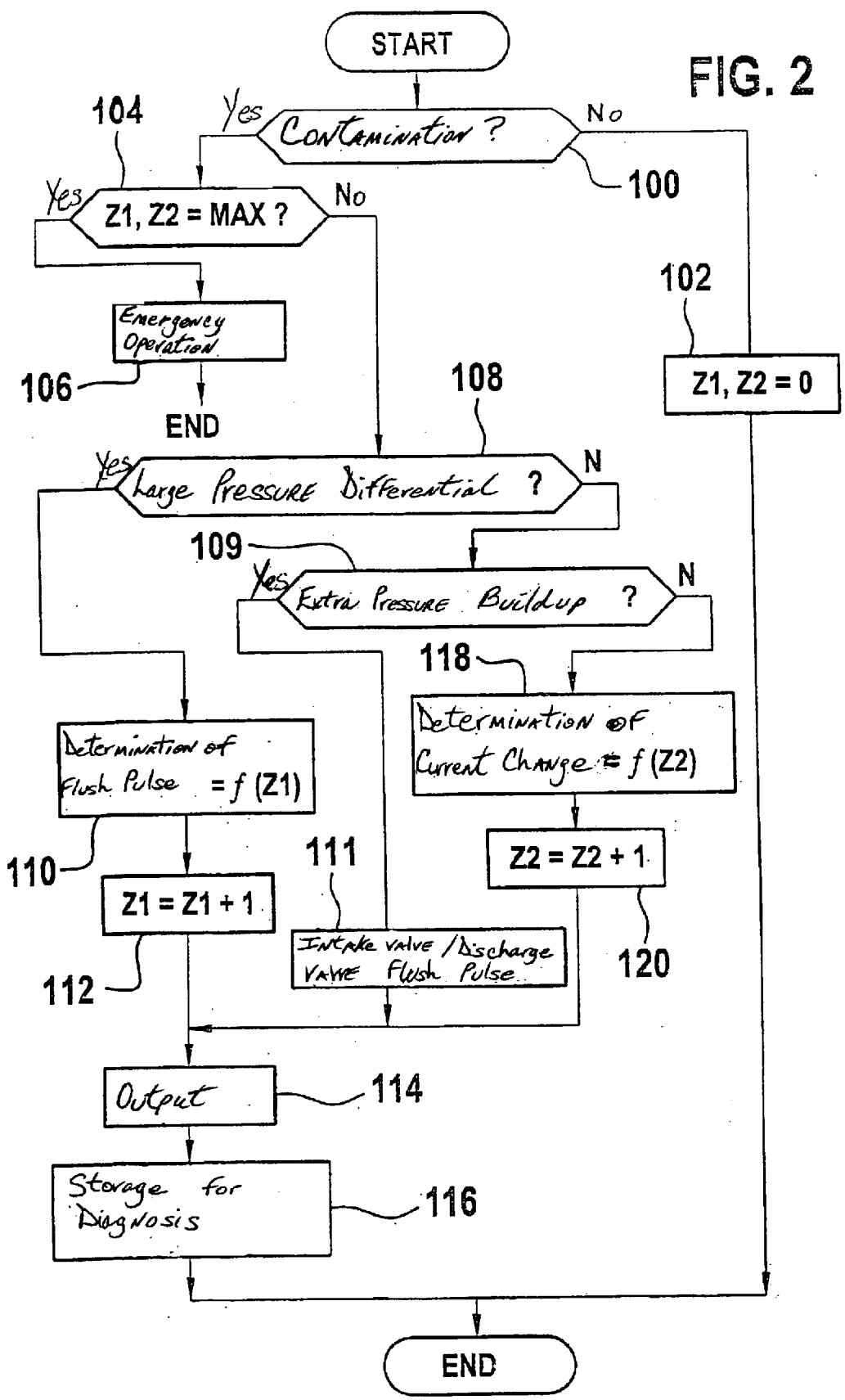
FIG. 2 shows a flow chart of the method(s) of removing a contamination.

In the embodiment, the methods described are implemented in the framework of a program for a computer unit of the control unit for controlling the at least one valve. A program of this type is outlined as a flow chart in FIG. 2. It is executed at selected times during the operation of the control unit. After the start of the program part outlined in FIG. 2, it is checked in a first step 100 whether indications of a contamination of at least one valve exist. This is the case if, on the basis of the system monitoring, it was detected that a leak is present in the control system. For example, if it has been detected on the basis of the accumulator pressure that the accumulator pressure is not maintained when the pump is not activated, then a leak in at least one intake valve is to be assumed. The same reasoning applies if, on the basis of the accumulator pressure, too small an accumulator pressure gradient was detected while the pump was charging the accumulator, or an excessively long accumulator charging time until reaching the desired value of accumulator pressure, an excessive frequency of accumulator recharging, or discharge of the accumulator when the vehicle is turned off were detected. A leak in the intake valve is also to be suspected if an undesired pressure increase (e.g., without braking) was detected in a wheel brake on the basis of the brake pressure signal. A leak in the region of a discharge valve is to be assumed if the wheel brake pressure may not be maintained. This is assessed on the basis of the brake pressure signal. If the system monitoring has not given any indication of a contamination of valves of this type, counters Z1 and Z2 are set to value 0 in step 102 and the program is terminated. It is then executed again at the next time interval.

If the result of step 100 is that indications of contamination in at least one valve have been provided to the system monitoring, it is checked in step 104 whether counter Z1 or counter Z2 or the sum of the two counts have reached selected maximum values. If this is the case, in accordance with step 106, emergency operation of the braking system is initiated and the program is terminated.

If the result of step 104 is that a maximum value has not been reached, it is checked in step 108 whether a large pressure differential exists across the valve. This is determined, for example, by comparing accumulator pressure (inlet side of the intake valve) and wheel brake pressure (outlet side of the intake valve) and/or, for discharge valves, on the basis of the wheel brake pressure (at whose outlet side atmospheric pressure prevails). If the pressure differential is greater than an applied value, it is assumed that the flow speed is sufficient to tear the contamination particles loose. Therefore, the intensity and length of the flush pulse are determined in step 110. In the embodiment, they are a function of the frequency of the flushes performed so far, i.e., of count Z1. The larger this count, the longer and/or stronger the application of current to the valve will be. Count Z1 is increased by 1 in subsequent step 112 and then output in step 114. The fact that a flush pulse of this type was output is stored in step 116 for diagnostic purposes and/or to correct the pressure controller. The program is then terminated and executed again at the next time interval.

If the result of step 108 is that there is not a sufficiently large pressure differential, it is checked in step 109 whether an extra pressure buildup may be generated. This is the case, for example, if a leak was detected at a discharge valve (e.g., through one of the methods described above or discussed in the references cited above). The method is also applied if an intake valve shows a leak and there is only a small pressure differential. If this is the case, in step 111, inlet valve and discharge valve (or valves for faults which need not be localized) of the same wheel brake(s) are opened briefly, similarly to the flush pulse described above. Through this hydraulic (or pneumatic) short-circuit, a high flow speed is, generated in the area of the discharge valve, which detaches the contamination. In one exemplary embodiment, the length of the opening may be a function of the number of flushes or number of joint openings of the valves.

If the result of step 109 is that the conditions for an extra pressure buildup do not exist, an activation signal is produced in step 118, through which the valve ball is struck against the valve seat. For valves which are normally open, this is a pulse having a very large current change at the beginning; the magnitude of the current change and the strength of the current also may be a function of the frequency of the valve impacts in this case, i.e., of count Z2. For a valve which is normally closed, an activation signal which first opens the valve and then suddenly deenergizes it is determined in step 118. In this case as well, the rate of change of the current and the strength of the prior application of current may also be a function of count Z2 in the exemplary embodiment. Count Z2 is increased by 1 in step 120 and then the activation signal determined in step 118 is output in step 114.

Only one valve (e.g., for a leak detected on the basis of the wheel brake pressure, the corresponding intake valve in response to undesired braking pressure increase, or the corresponding discharge valve in response to undesired reduction) or all intake valves or discharge valves are operated for cleaning as a function of the results of the monitoring. The latter occurs above all for a leak detected on the basis of the accumulator pressure, which does not permit more precise fault localization. Therefore, the program shown in FIG. 2 may be executed separately for each valve.

During the output of the flush pulse and/or of the activation signal for the valve impact, the pressure controller is deactivated.

Depending on the exemplary embodiment, either only the flush pulse is applied or only the valve impact, or both are applied in combination.

What is claimed is:

1. A method of controlling a valve that is actuated by an activation signal that represents a current through a valve coil, the method comprising:

detecting a leak in a control system that includes the valve, the leak being related to a malfunction of the valve; and outputting the activation signal of at least one of a selected length, an intensity, and a rate of change, to activate the valve in response to the detected leak, so as to one of:
   briefly open and close the valve, the activation signal being generated to briefly open the valve when a pressure differential across the valve exceeds a selected magnitude;
   briefly open an inlet valve and a discharge valve in response to a small pressure differential; and
   guide a valve ball onto a valve seat with great speed.

2. The method of claim 1, wherein the valve includes a seat valve that is brought into a position between a completely closed position and a completely open position by the activation signal in normal operation.

3. The method of claim 1, wherein, to briefly open the valve, another activation signal is determined which supplies the current at a selected intensity to the valve for a selected time.

4. The method of claim 1, wherein at least one of a length and an intensity of the activation signal is a function of the frequency by which the valve is briefly activated.

5. The method of claim 1, wherein an activation of the valve is stored for at least one of a diagnostic purpose and a regulating purpose.

6. A method of controlling a valve that is actuated by an activation signal that represents a current through a valve coil, the method comprising:

detecting a leak in a control system that includes the valve, the leak being related to a malfunction of the valve; and outputting an activation signal of at least one of a selected length, an intensity, and a rate of change, to activate the valve in response to a detected leak, so as to one of:
   briefly open and close the valve, the activation signal being generated to briefly open the valve when a pressure differential across the valve exceeds a selected magnitude;
   briefly open an inlet valve and a discharge valve in response to a small pressure differential; and
   guide a valve ball onto a valve seat with great speed;
   wherein, in response to a pressure differential across the valve that is less than the selected magnitude, the current is briefly one of fed to and cut off from the valve, so that the valve ball is moved into the valve seat at high speed.

7. The method of claim 1, wherein a magnitude of a change in at least one of the current and an intensity of the current is a function of a frequency by which the valve is activated.

8. The method of claim 1, wherein at least one of a duration of the brief opening of the valve, an intensity of the brief opening of the valve, and a rapid activation of the valve are selected so that effects on a behavior of the control system are one of minimized and reduced.

9. The method of claim 8, wherein the valve is a discharge valve that is one of briefly opened and rapidly activated in response to a detected leak therein.

10. A device for controlling a valve, comprising:

a control unit that includes at least one computer arrangement to provide an activation signal for actuating the valve;

wherein the at least one computer arrangement includes:
    a first arrangement to detect a leak in a control system that includes the valve, the leak being related to a malfunction of the valve; and
    a second arrangement to output the activation signal of at least one of a selected length, a intensity, and a rate of change to activate the valve in response to the detected leak, so as to one of:
    briefly open and close the valve, the activation signal being generated to briefly open the valve when a pressure differential across the valve exceeds a selected magnitude;
    briefly open an inlet valve and a discharge valve in response to a small pressure differential; and
    guide a valve ball onto a valve seat with great speed.

* * * * *